United States Patent
Sorenson, III

(10) Patent No.: US 12,056,158 B1
(45) Date of Patent: Aug. 6, 2024

(54) FAST RECOVERY OF PARTIONED REPLICATED DATA STORE

(71) Applicant: Amazon Technologies, Inc., Seattle, WA (US)

(72) Inventor: James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 943 days.

(21) Appl. No.: 15/601,825

(22) Filed: May 22, 2017

(51) Int. Cl.
*G06F 16/27* (2019.01)
*G06F 11/14* (2006.01)

(52) U.S. Cl.
CPC ........ *G06F 16/278* (2019.01); *G06F 11/1425* (2013.01); *G06F 2201/80* (2013.01); *G06F 2212/154* (2013.01)

(58) Field of Classification Search
CPC .............. G06F 16/278; G06F 11/1425; G06F 2201/80; G06F 2212/154
See application file for complete search history.

(56) References Cited

U.S. PATENT DOCUMENTS 9,304,815 B1    4/2016  Vasanth et al.
2004/0215640 A1*  10/2004  Bamford ................. G06F 16/27
2011/0099420 A1    4/2011  MacDonald McAlister et al.
2011/0225122 A1*   9/2011  Denuit .................. G06F 16/178
                                                                707/634
2015/0120658 A1*   4/2015  Rath ..................... G06F 16/278
                                                                707/623
2016/0335166 A1*  11/2016  George ............... G06F 11/2094

* cited by examiner

*Primary Examiner* — Apu M Mofiz
*Assistant Examiner* — Husam Turki Samara
(74) *Attorney, Agent, or Firm* — Robert C. Kowert; Kowert, Hood, Munyon, Rankin & Goetzel, P.C.

(57) ABSTRACT

Systems and methods are provided to implement a fast recovery process in a partitioned replicated data store. In some embodiments, the data store is configured to store an object in a plurality of partitions and replicate data in each partition in a group of replica nodes to satisfy a durability model. In response to a replica failure, the data store performs a split operation to create a plurality of new partitions. The partition's data is split into subsets corresponding to the new partitions. The subsets are transmitted, in parallel, from the surviving replica nodes of the partition to new replica nodes in the new partitions. The new partitions then replicate respective subsets of data in their respective replication groups using a chained replication technique. The recovery process allows the data store to return into compliance with the durability model more quickly, by parallelizing the copying of data.

17 Claims, 10 Drawing Sheets

FAST RECOVERY OF PARTIONED REPLICATED DATA STORE

BACKGROUND

Database systems managing large amounts of data on behalf of users may partition the data into separately managed partition groups. Such a partitioned arrangement allows the database to take advantage of infrastructure of the SaaS network, and also provides for more robust scalability of the database. In addition, the database system may distribute and/or replicate that data across two or more machines, often in different locations, for any of a number of reasons, including security issues, disaster prevention and recovery issues, data locality and availability issues, etc. These machines may be configured in any number of ways, including as a shared resource pool. With the increasing use of partitions and replicas, the database system may experience failures of a portion of its systems maintaining a piece of the data (e.g., a replica). The process of repairing such problems in the database is often times complicated and time consuming. It is generally desirable to improve the speed of the recovery process in the event of these types of failures.

Figure 1:
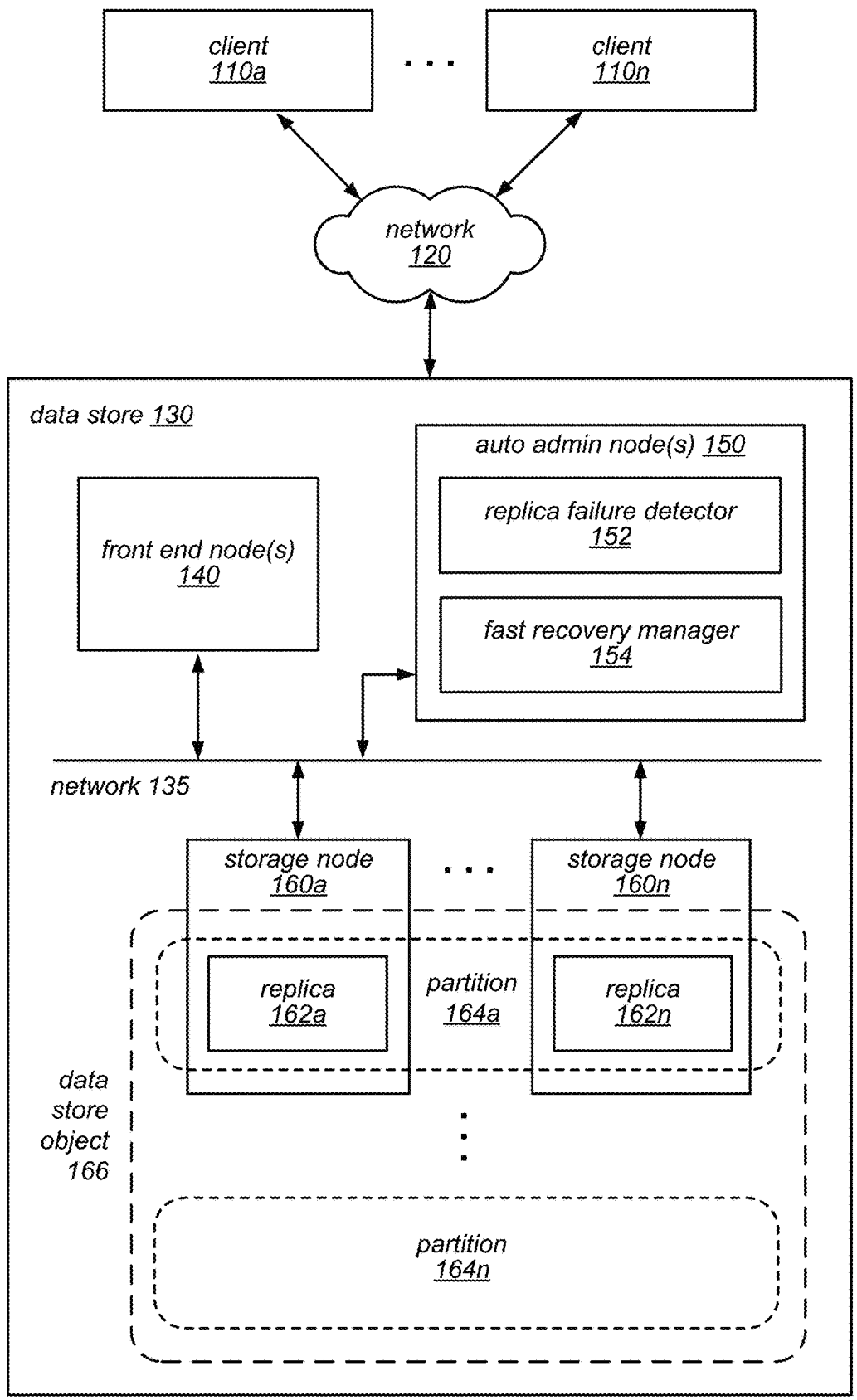
FIG. 1 is a block diagram illustrating an example computer system that implements a fast recovery in a partitioned replicated data store, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a fast recovery process in a partitioned replicated data store, according to some embodiments. In some embodiments, the partitioned replicated data store stores data (e.g., individual database objects such as tables) in partitions that are separately managed by a group of compute nodes, which may be referred to herein as storage nodes. In some embodiments, the group of storage nodes may maintain multiple replica of the data of the partition on different storage devices to improve data durability and availability, forming a replica group. In some cases, when one or more replicas in a partition fails, the remaining storage nodes in the partition are split into multiple new partitions, each having a subset of the data of the old partition. The split allows data in the partition to be copied to the new partitions in parallel, thereby returning the data store into compliance with its durability model more quickly. The new partitions may be merged back together at a later time, depending on the partitioning policy of the data store.

The data store described herein may in various embodiments support a flexible schema, a plurality of available consistency models, a variety of service level and/or business model options, multiple indexing options, and/or multiple query types. In some embodiments, clients of the data store (e.g., users, subscribers or client applications) may interact with the data store as a service, for example through a web service interface using seft of interfaces, such that clients of the service are largely relieved from the burden of database administration. In some embodiments, the data store may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. Thus, the data store may in some embodiments initiate the re-sizing (scaling) and/or repartitioning of a table in response to receiving one or more requests to store, retrieve, modify, or delete items in the scalable table.

In various embodiments, the data store described herein may provide an application programming interface (API) that includes support for some or all of the following operations on the data in a table maintained by the data store on behalf of a client: put (or store) an item, get (or retrieve) one or more items having a specified primary key, delete an item, update the attributes in a single item, query for items using an index, and scan (e.g., list items) over the whole table, optionally filtering the items returned. In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

FIG. 1 is a block diagram illustrating an example computer system that implements a fast recovery in a partitioned replicated data store, according to some embodiments. As shown, the system may include one or more clients 110, which may encompass any type of client configurable to submit service requests to a network-based data store 130 via network 120. In some embodiments, the data store 130 may not be a network-based storage service, but rather be accessed by a client 110 in the same computer. In some embodiments, a given client 110 may include a suitable version of a web browser or a plug-in module for a web browser, or other type of code module configured to execute as an extension to or within an execution environment to provide database or data storage service clients (e.g., client applications, users, and/or subscribers) access to the services provided by data store 130. Alternatively, a client 110 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 110 may be an application configured to interact directly with the data store 130. In some embodiments, a client 110 may be configured to generate web service requests according to a Representational State Transfer (REST)-style web services architecture, a document- or message-based web services architecture, or another suitable web services architecture.

In some embodiments, client 110 may be configured to provide access to data store 130 to a client application in a manner that is transparent to those applications. For example, a client 110 may be configured to integrate with an operating system or file system to provide storage in accordance with a suitable variant of the storage model described herein. In some embodiments, the operating system or file system may present a different storage interface to applications, such as a game, a conventional file system hierarchy of files, directories and/or folders, etc.

As illustrated, the clients 110 may convey requests to and receive responses from the data store 130 via a network 120. In various embodiments, network 120 may encompass any suitable combination of networking hardware and protocols necessary to establish network communications between client 110 and data store 130. For example, network 120 may encompass the various telecommunications networks and service providers that collectively implement the Internet. Network 120 may also include private networks such as local area networks (LANs) or wide area networks (WANs) as well as public or private wireless networks. For example, both a given client 110 and data store 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and data store 130. In some embodiments, client 110 may communicate with network-based data store 130 using a private network rather than the public Internet. For example, a client 110 may be provisioned within the same enterprise as the data store 130 and/or the underlying system described herein. In some embodiments, a client 110 may comprise a service that is offered by the same service provider that offers the data store 130 as a service. The client 110 may communicate with the data store 130 entirely through a private network 120 (e.g., a LAN or WAN that may use Internet-based communication protocols but which is not publicly accessible).

Generally speaking, data store 130 may be configured to implement one or more service endpoints configured to receive and process services requests, such as requests to access tables maintained on behalf of clients/users by a data store, and/or the items and attributes stored in those tables. For example, data store 130 may include hardware and/or software configured to implement various service endpoints and to properly receive and process HTTP-based web services requests directed to those endpoints. In one embodiment, data store 130 may be implemented as a server system configured to receive web services requests from clients 110 and to forward them to various components that collectively implement a data storage system for processing. In other embodiments, data store 130 may be configured as a number of distinct systems (e.g., in a cluster topology) implementing load balancing and other request management features configured to dynamically manage large-scale web services request processing loads.

In various embodiments, the components in the data store 130 may be implemented directly within computer hardware, as instructions directly or indirectly executable by computer hardware (e.g., a microprocessor or computer system), or using a combination of these techniques. For example, the components of the data store 130 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

The APIs provided by the data store 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In addition to functioning as an endpoint for clients' service requests, in some embodiments the data store 130 may implement various client management features. For example, data store 130 may coordinate the metering and accounting of client usage of services, including storage resources, by tracking the identities of requesting clients 110, the number and/or frequency of client requests, the size of tables and/or items stored or retrieved on behalf of clients 110, overall storage bandwidth used by clients 110, class of storage requested by client 110, and/or any other measurable client usage parameter. The data store 130 may also implement financial accounting and billing systems, or may maintain usage data that may be queried and processed by external systems for reporting and billing of client usage activity. In some embodiments, the data store 130 may include a lock manager and/or a bootstrap configuration.

As illustrated, in various embodiments, the data store 130 may include a front end module 140, which may be configured to receive, authenticate, parse, throttle and/or dispatch service requests, among other things. The data store 130 may also include one or more administrative components, or auto admin nodes 150, which may be configured to provide a variety of administrative and/or control functions, as described in more detail below. The data store 130 may also include a plurality of storage node instances 160a to 160n, each of which may maintain and manage one or more replicas 162a to 162n of data on behalf of clients/users or on behalf of the data store itself. In some embodiments, these components of the data store 130 may be connected via an internal network 135. In some embodiments, the front end nodes 140, auto admin nodes 150, and storage nodes 160 may be part of a distributed system implemented using clusters of nodes, each connected to a cluster interconnect. In some embodiments, at least some of the front end nodes 140, auto admin nodes 150, and storage nodes 160 may be implemented as virtual machine instances that are hosted on physical hosts. These virtual machine instances may be provisioned and de-provisioned to suit the needs of the data store instance.

As illustrated, the data store 130 may distribute its data in multiple partitions, such as partition 164. For example, in some embodiments, data store objects 166 such as tables or indexes may store items in multiple partitions based on a partition key of the object. Each partition 164 may implemented using a group of storage nodes 160a to n. In some embodiments, these storage nodes may be virtual machine instances. The storage nodes 160 may include software configured to perform a storage functions such as the handling of storage requests, partition management, and/or replication and failover processes. In some embodiments, a storage node 160 may include a storage engine, which may be configured to maintain (i.e. to store and manage) one or more tables or indexes in storage via a storage API.

In some embodiments, a group of storage nodes 160 hosting a partition 164 may form a replica group, in which each storage node maintains a replica 162a to n of the data of the partition (e.g., partition 164a). In some embodiments, a replica group may include one or more master replica nodes that coordinates the storage operations within the replica group. For example, in some embodiments, the master replica may be the primary handler of all write requests to the partition to enforce a durability model. In some embodiments, the durability model may specify that a write is deemed durable when a certain number of replica nodes in the replica group acknowledge the write. In some embodiments, each replica group may operate as a largely independently unit of storage that is capable of handling all routine reads and writes to its partition 164 without relying on the storage nodes of other replica groups.

As illustrated, in some embodiments, the data store 130 may implement components over one or more auto admin nodes 150, which may include a replica failure detector 152 and a fast recovery manager 154. From time to time, a replica 162 may fail within a partition 164. Such failures may be caused by a variety of reasons, such as for example, the failure of a storage node 160, or the failure of one or more storage devices used by the storage node, or a failure of the network 135. In some cases, a module in the control plane such as the replica failure detector 152 may detect that a replica has become unresponsive. The replica failure detector 152 may examine the metadata associated with the unresponsive replica to determine whether the replica group including the partition 164 is in a healthy state. In some embodiments, the healthy state definition may be used to determine if the partition 164 is in a healthy state. A healthy state definition may require, for example, that each portion of the partition's data is stored at a minimum number of storage locations. In some embodiments, a healthy state definition may require that a partition include a minimum number of replicas. If the replica failure detector 152 detects that a partition 164 is not in a healthy state, it may initiate a recovery or repair process to bring the partition back into a healthy state.

In some embodiments, the recovery or repair process may be performed by a fast recovery manager 154, as shown. In some embodiments, the fast recovery manager 154 may implement a fast recovery process, in which the partition containing the failed replica is split using a split operation to create two or more new partitions, each having a subset of the data stored in the partition having the failed replica. In some embodiments, the fast recovery manager 154 may provision or enlist other storage nodes from a pool of storage nodes in the data store 130 to create the new partitions. In some embodiments, the surviving replicas in the partition may join the newly created partitions. In other embodiments, the surviving replicas in the partition may simply be used to perform a copy of the data in the partition to the new partitions, before they are retired. In any event, the partition's data may split into multiple portions to be copied into the new partitions.

In some embodiments, the split operation may produce a number of new partitions that is equal to the number of surviving replicas in the partition, and assign each surviving replica to a different new partition. The partition's data may be divided into approximately equal portions to be distributed among the new partitions. During the copy process, multiple (or all) surviving replica in the partition group may be used to transmitting a portion of the partition's data to the new partitions. In some embodiments, multiple new replicas may be used to receive the partition's data. In this manner, the recovery process can take full advantage of the surviving and new replicas to parallelize the copying process.

In some embodiments, the fast recovery manager 154 may select a subset of surviving replicas as source replicas to transmit the partition's data. The selection may examine the capabilities of each of the surviving replicas, including for example the speed of their network interface cards, the number of network interfaces, the access throughput that they can achieve from their respective storage devices, etc. In some embodiments, slow or less capable replicas may be excluded as source replicas during the recovery process. In some embodiments, faster or more capable replicas may be assigned to transmit larger or more portions of the data. For example, in some cases where a surviving replica is implemented on a node having two network interfaces, that surviving replica may be selected to transmit two portions of data in parallel. In some embodiments, the network 135 may be fully multiplexed to allow for multiple data traffic flows between the nodes, such that it does not present any significant speed constraints on the copy process.

It is noted that although the replica failure detector 152 and fast recovery manager 154 shown as centralized management modules in the auto admin node(s) 150, in some embodiments, they may be implemented differently. For example, in some embodiments, at least some of the functionality described for the replica failure detector 152 and fast recovery manager 154 may be implemented in the storage nodes themselves. In some embodiments, the replicas 162 that are members of a replica group may poll themselves via an ongoing peer-to-peer protocol in order to detect failures within the replica group. In some embodiments, once a failed replica is detected in the replica group, the surviving replicas may self-partition into multiple new partitions, and select among themselves a group of source replicas to propagate the data of the partition.

In some embodiments, the replica group in the partitions may implement a replication operation to replicate data among its replica nodes. In some embodiments, the replication operation may use a replication chaining technique propagate data to the storage nodes of the group. In the replication chaining technique, the replicas in the partition may be sequentially "chained," so that write data sent to the first replica in the chain (a head replica) is forwarded to a second replica in the chain, then to a third, and so on, until a tail replica. In some embodiments, the tail replica may acknowledge receipt of the write data to the sender of the write data. In some embodiment, the ordering of the replicas in the chain is specified by a chain mapping maintained by the replica group. In some embodiments, multiple replication chains may exist in a replica group. Moreover, in some embodiments, the write data sent to a replication chain may be streamed from one replica in the chain to the next, so that a sending replica does not necessarily receive or store all of the write data before forwarding the stream to the next replica in the chain. In this manner, large write operations to the replica group may be parallelized among the replicas to an extent. Thus, during a fast recovery process, a surviving replica in the partition may send its assigned portion of the data to a head replica for a replication chain in the new partition, and allow replication to occur efficiently within the new partitions via the replication chain.

Once the respective portions of data from the old partition have been received and stored in the replicas of the new partitions, the data store 130 is again in compliance with its durability model. In some embodiments, as long as all of the data in the data store are properly replicated in a healthy partition, in a specified number of replicas, then the data store is in compliance with its durability model. In some embodiments, compliance with the durability model allows the data store to be brought back online to service requests. Thus, the data store 130 is recovered into a state with more but smaller partitions. But because the recovery process is parallelized to use multiple source and destination replicas to copy the data out of the old partition, the data store is able to recover much faster.

In some embodiments, after the recovery process, the data store 130 merge the new partitions that were generated during the recovery. The partition splitting is performed during the recovery process primarily to speed up the recovery. Once the data store 130 is returned to a state where it is in compliance with its durability model, the data store 130 may readjust its partitions back into an appropriate state based on the partitioning policy of the data store. For example, in some embodiments, the number of partitions for a data store object 166 may depend on the amount of data or amount of access throughput that is associated with or provisioned to the object. Thus, after the recovery, the data store may readjust its partitions in accordance with its partitioning policy. In some embodiments, the merge may be performed during a time when the partitions are not experiencing heavy request traffic. In some embodiments, the merge may be performed by copying the data in multiple partitions into a single offline partition, and then bringing the single partition online after the copying is complete, using an atomic operation.

Figure 2A:
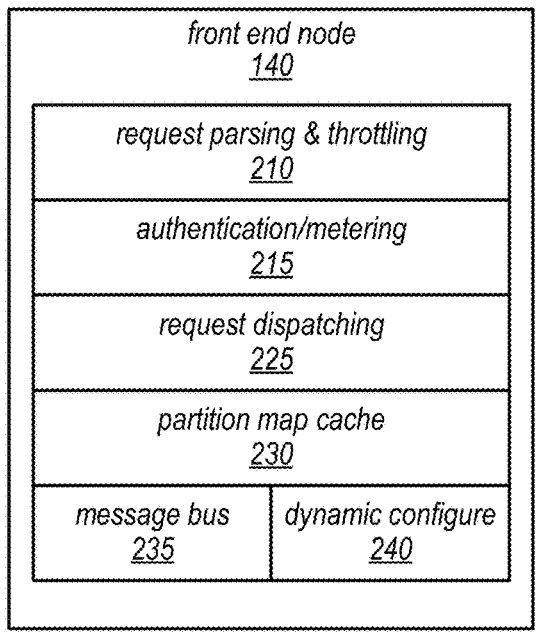
FIGS. 2A-2C illustrate various elements or components of an example computer system that implements a fast recovery in a partitioned replicated data store, according to some embodiments.
Figure 2B:
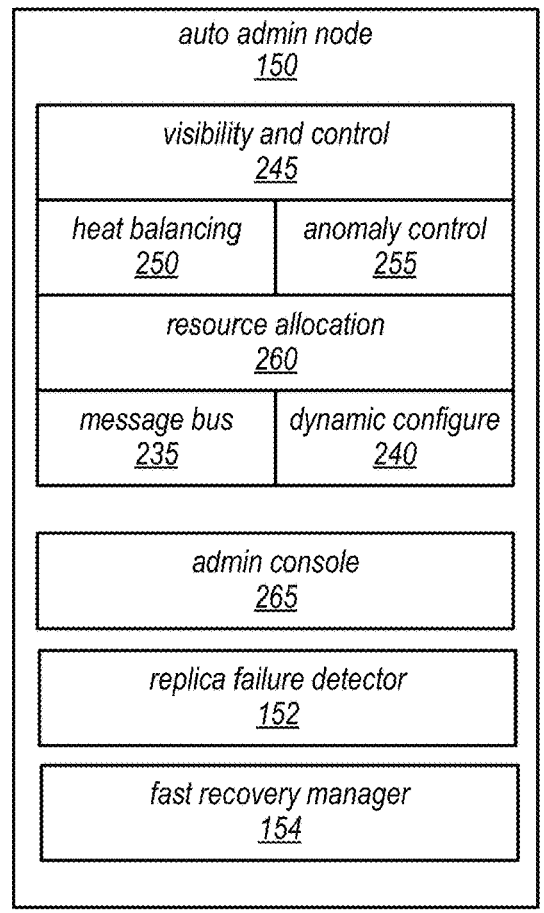
Figure 2C:
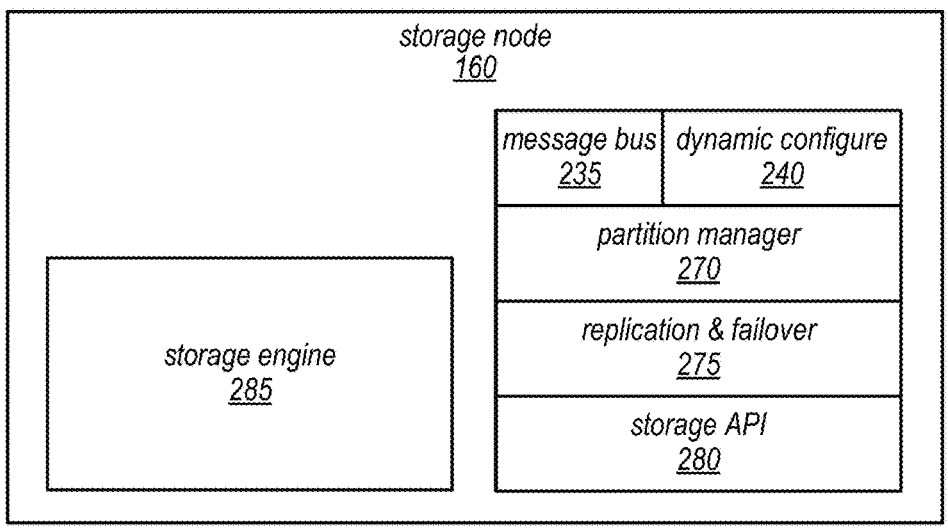

FIGS. 2A-2C illustrate various elements or components of an example computer system that implements a fast recovery in a partitioned replicated data store, according to some embodiments. As illustrated in FIG. 2A, a front end module 140, as discussed in connection with FIG. 1, may include one or more modules configured to perform parsing and/or throttling of service requests (shown as 210), authentication and/or metering of service requests (shown as 215), dispatching service requests (shown as 225), and/or maintaining a partition map cache (shown as 230). In addition to these component-specific modules, front end module 140 may include components that are common to multiple types of computing nodes that collectively implement the data store 130, such as a message bus (shown as 235) and/or a dynamic configuration module (shown as 240). In some embodiments, other types of communications interconnect may be employed to connect the nodes in the data store. In some embodiments, more, fewer, or different elements may be included in front end module 140, or any of the elements illustrated as being included in front end module 140 may be included in another component of data store 130 or in a component configured to interact with data store 130 to provide the data storage services described herein.

As illustrated in FIG. 2B, an auto admin node 150, as discussed in connection with FIG. 1, may include one or more modules configured to provide visibility and control to system administrators (shown as 245), or to perform heat balancing (shown as 250), and/or anomaly control (shown as 255), resource allocation (shown as 260). Auto admin node 150 may also include an admin console 265, through which system administrators may interact with the data storage service (and/or the underlying system). In some embodiments, admin console 265 may be the primary point of visibility and control for the data storage service (e.g., for configuration or reconfiguration by system administrators). For example, admin console 265 may be implemented as a relatively thin client that provides display and control functionally to system administrators and/or other privileged users, and through which system status indicators, metadata, and/or operating parameters may be observed and/or updated. In addition to these component-specific modules, auto admin instance 150 may also include components that are common to the different types of computing nodes that collectively implement the data store 130, such as a message bus (shown as 235) and/or a dynamic configuration module (shown as 240). In other embodiments, more, fewer, or different elements may be included in the auto admin node 150, or any of the elements illustrated as being included in auto admin node 150 may be included in another component of data store 130 or in a component configured to interact with data store 130 to provide the data storage services described herein.

As illustrated, the auto admin node 150 may also include a replica failure detector 152. In some embodiments, the replica failure detector 152 may be implemented as a sweeper module that periodically or aperiodically analyzes the contents of metadata for the partition. For example, such metadata may indicate the health status of the replicas in the replica group. In some embodiments, the replica failure detector 152 may check to determine if the replica group is compliant with a healthy state definition for the partition. A healthy state definition may require, for example, that each portion of the partition's data is stored at a minimum number of storage locations. In some embodiments, a healthy state definition may require that a partition include a minimum number of replicas. If the replica failure detector 152 detects that a partition 164 is not in a healthy state, it may initiate a recovery or repair process to bring the partition back into a healthy state.

As illustrated, the auto admin node 150 may also include a fast recovery manager 154. In some embodiments, the fast recovery manager may not be the only recovery manager implemented by the auto admin node 150. For example, the auto admin node may include a number of recovery managers that implement a number of different recovery processes, which may be chosen based on client or administrator preferences, or depending on detected conditions. Thus, for example, for a data store that must remain highly available, the fast recover manager 154 may be used, whereas a normal recovery manager may be used for other data stores. As another example, a fast recovery manager may be used for partitions holding frequently used data or at a time when the partition is experiencing a high level of access load. The fast recover manager may be used under these conditions, and a normal recovery manager may be used under other conditions.

In some embodiments, the fast recovery manager 154 may implement a fast recovery process in which a partition having one or more failed replicas is split into two or more new partitions, using a split operation. In some embodiments, the split operation may create two or more new partitions by enlisting other storage nodes operating in the data store network. In some embodiments, the number of new partitions may be equal to the number of surviving replicas in the partition. The surviving nodes of the partition may or may not join the new partitions. In some embodiments, each newly created partition may be designated to store a subset of the data that was stored in the partition.

In other embodiments, the surviving replicas in the partition may then transmit portions of the data in the partition to the respective new partitions. The partition's data may be divided into approximately equal portions to be distributed among the new partitions. During the copy process, multiple surviving replica may be tasked with transmitting a portion of the partition's data to the new partitions. In some embodiments, multiple new replicas may be used to receive the partition's data. In this manner, the recovery process can take full advantage of the surviving and new replicas to parallelize the copying process.

In some embodiments, the fast recovery manager 154 may select a subset of surviving replicas as source replicas to transmit the partition's data. The fast recovery manager 154 may examine the capabilities of each of the surviving replicas, including for example the speed of their network interfaces, the number of network interfaces, the access throughput that they can achieve from their respective storage devices, etc. In some embodiments, slow or less capable replicas may be excluded as source replicas during the copying process. In some embodiments, faster or more capable replicas may be assigned to transmit larger or more portions of the data during the copying process. For example, in some cases where a surviving replica is implemented on a node having two network interfaces, that surviving replica may be selected to transmit two portions of data in parallel. In some embodiments, the message bus 235 may have a high bandwidth, such that it does not present any significant speed constraints on the copy process.

As illustrated in FIG. 2C, storage node 160 may include one or more modules configured to provide partition management (shown as 270), to implement replication and failover processes (shown as 275), and/or to provide an application programming interface (API) to underlying storage (shown as 280). As illustrated in this example, each storage node 160 may include a storage engine 285, which may be configured to maintain (i.e. to store and manage) one or more tables (and associated table data) in storage 280 on behalf of one or more clients/users. In addition to these component-specific modules, storage node instance 160 may include components that are common to the different types of computing nodes that collectively implement the data store 130, such as a message bus (shown as 235) and/or a dynamic configuration module (shown as 240). In other embodiments, more, fewer, or different elements may be included in storage node instance 160, or any of the elements illustrated as being included in storage node instance 160 may be included in another component of the data store 130 or in a component configured to interact with the data store 130 to provide the data storage services described herein.

In some embodiments, each storage node may host a number of replicas, each belong to a different replica group. A replica failure may result from a number of situations. For example, a failure may be caused by a corruption of data to a particular replica, in which case the replica management software on the storage node 160 will generate an error indicating to the replica group that its replica is invalid and lost. In another example, the storage device holding the replica may experience a hardware failure, causing some of the data, including the replica, to be lost. In another example, the storage node 160 itself may crash or experience a hardware failure, thus causing the storage node 160 to become unresponsive to the rest of the replica group. The data store 130 is designed to detect such failures (for example using the replica failure detector 152 or via self-reporting from the replica group itself), and initiate a repair or recovery process (for example using the fast recovery manager 154).

During the recovery process, the failed replica may be excommunicated from the replica group. In some embodiments, a fast recovery manager 154 may provision or form a number of new partitions which will replace the partition having the failed replica. The fast recovery manager 154 may then divide up surviving replicas to either join the new replica groups and/or act as source replicas to transmit data into the new partitions. On storage nodes acting as source replicas, the replica management software may be asked by the fast recovery manger 154 to transmit a portion of the partition's data to a destination replica in a new partition. On storage nodes acting as destination replicas, the replica management software may receive the portion of data and populate its own storage device with the data, via the storage engine 285 and/or storage API 280. In some embodiments, the received data may be replicated in a replication operation across the replica group of the new partition. In some embodiments, the data from the partition may be received as a stream, and the destination replica may implement a chained copy wherein the received stream is forwarded to another replica in the new partition. The replication chain may be specified by a chain mapping maintained in the new partition. By using the chained copy, a large amount of data may be copied to each replica in the new partition in a largely parallel fashion, thereby speeding up the copy process. In some embodiments, the last replica in the replication chain may provide an acknowledgment that the write data is received by the replication chain.

Figure 3A:
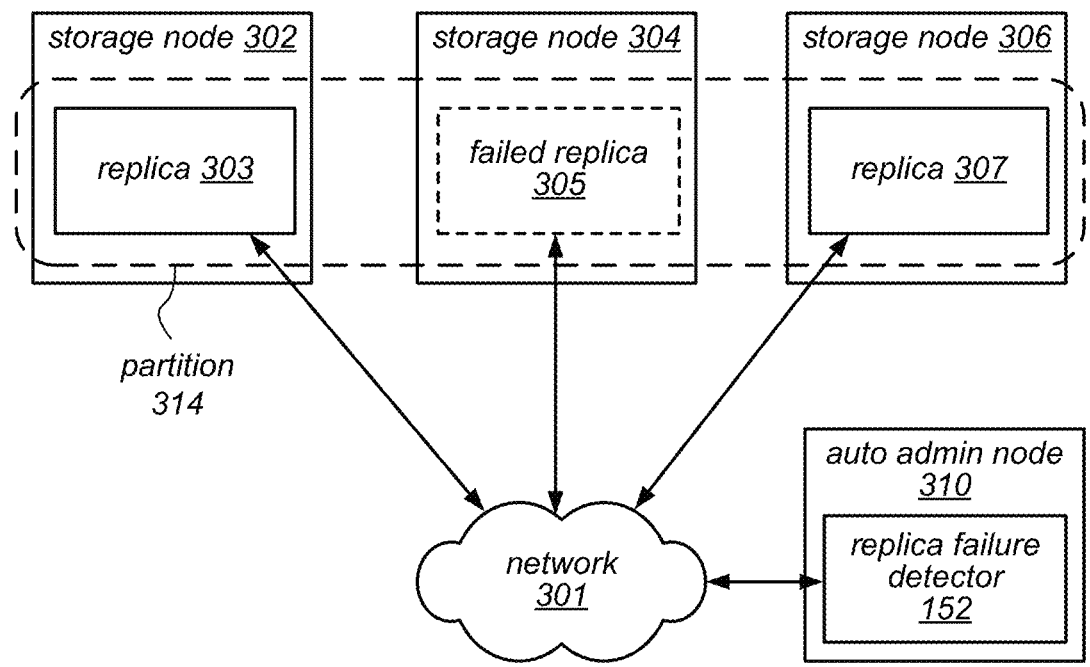
FIGS. 3A-3D are block diagrams illustrating the process of a fast recovery in a partitioned replicated data store, according to some embodiments.

FIGS. 3A-3D are block diagrams illustrating the process of a fast recovery in a partitioned replicated data store, according to some embodiments. In FIG. 3A, an example partition 314 is shown. The partition 314 is comprised of three storage nodes 302, 304, and 306, each hosting a respective replica 303, 305, and 307 of the data in the partition 314. Together, the three replicas form a replication group. In some embodiments, the partition 314 may maintain metadata regarding the partition 314, including for example the health status of the partition. The metadata may be maintained among the storage nodes of the partition 314, via a peer-to-peer protocol. The metadata itself may be replicated to some extend within the replica group. An auto admin node 310, as discussed, may include a replica failure detector 152. In some embodiments, the replica failure detector 152 may periodically or aperiodically scan the metadata for many partitions, and determine if the partitions are damaged or unhealthy.

Each of the nodes 302, 304, 306, and 310 may be implemented as separate computing nodes. In some embodiments, the compute nodes may be virtual machine instances operating on physical hosts. In some embodiments, the nodes all communicate over a network 301, which may be a cluster interconnect for all nodes in a data store, such as data store 130. The nodes may implement a peer-to-peer communication protocol on top of the physical network, for example, a message bus 235 as discussed in connection with FIGS. 2A-2C. The network 301 itself may be a packet-based network or some other type of network that allows data traffic flows from different senders to different receivers to be fully multiplexed. Thus, the primary speed constraint in such a network are the nodes themselves. As shown, the partition 314 has detected a failed replica 305. This failure may be detected by the replica failure detector 152 from the metadata 311, which includes monitored health status information from the replicas in the partition 314.

Figure 3B:
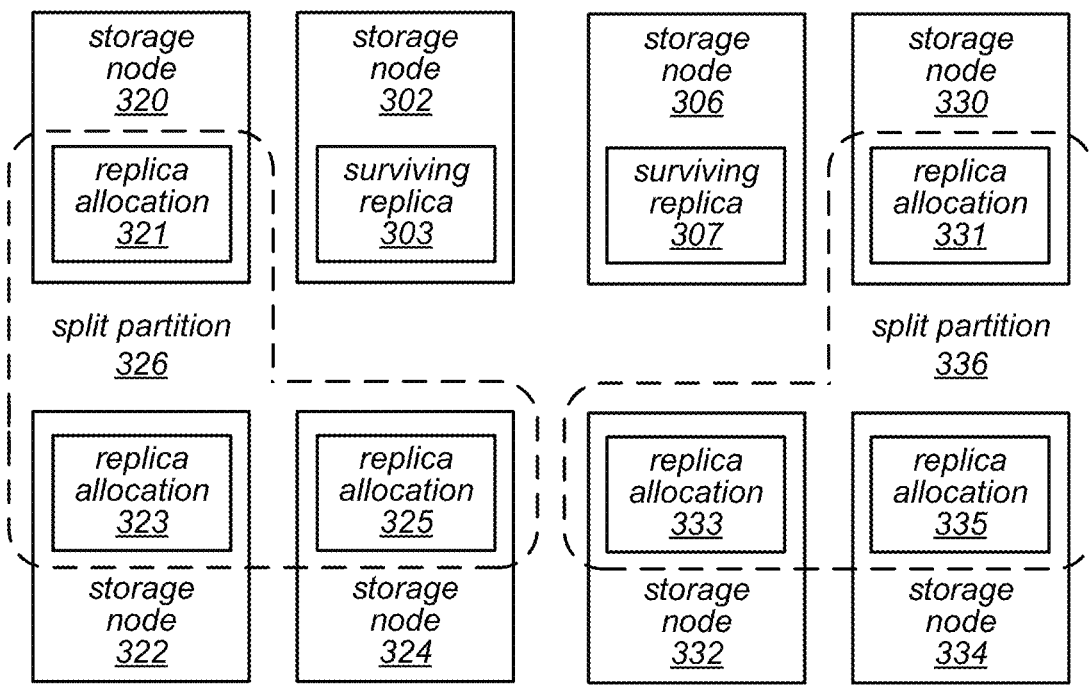

In FIG. 3B, a recovery or repair process begins for the partition 314. The recovery process may be carried out or managed by a centralized component, such as the fast recovery manager 154, or by the surviving storage nodes themselves, via a peer-to-peer protocol. As shown, a split operation is performed to create split partitions 326 and 336, to replace the partition 314. The new partitions 326 and 328 may be formed in a number of ways. In some embodiments, new storage nodes 320, 322, 324, 330, 332, and 334 may be recruited from a pool of storage nodes maintained by the data store 130. Each replica node may have a respective replica allocation to store a replica of the data in the new partition. The node recruitment process may select storage nodes to form the new partitions based on factors such as proximity to the storage nodes 302 and 306, the nodes' capabilities, and their current usage levels (e.g. number of other replicas hosted on the storage nodes). In some embodiments, the surviving replicas 303 and 307 may join the newly formed partitions 326 and 336. In that case, the surviving replicas may be trimmed so that they only contain the subset of data assigned to the respective partition that they joined. After the trimming operation, the surviving replica may behave just as another new replica of the new partition. In some embodiments, the formation of a replica group may be required to satisfy certain durability criteria of a durability model (e.g., different storage nodes should reside in different data centers, etc.)

In some embodiments, the partitions of the data store may all have the same number of replicas. In other embodiments, the partitions of the data store may have a variable number (e.g., two to four replicas). The recovery process may form new partitions having an appropriate number of member replicas, depending on the situation. In some embodiments, the recovery process may form a maximum number new partitions (e.g., one partition for each surviving replica), each new partition having the minimum number member replicas. By employing the maximum number of new partitions, the recovery process may maximize the degree of parallelization of the copying step. By using a minimum number of member replicas for each new partition, the system reduces resource spikes during the recovery process. In some embodiments, the number and size of new partitions to form in the recovery process may be controlled by one or more configuration parameters that are configurable by the administrator or the client.

Figure 3C:
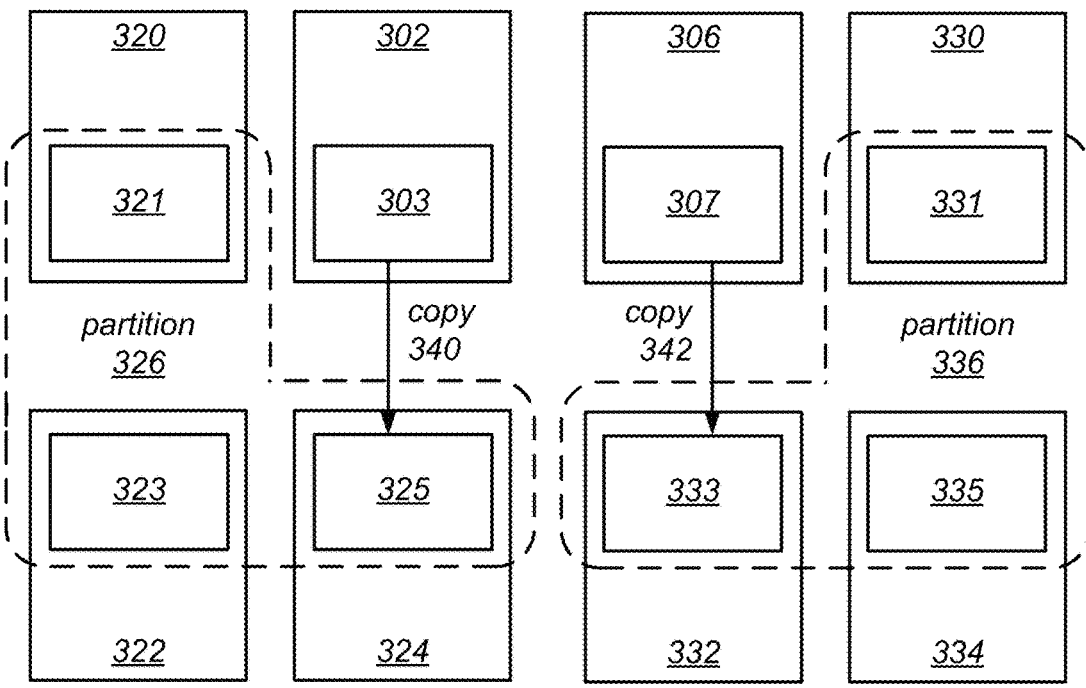

In FIG. 3C, a copy process is initiated from the surviving replicas 303 and 307 to one of the replica allocations of each replica group. In some embodiments, the surviving replicas may not join the newly formed partitions 326 and 336, and the space allocated to these replicas may be deallocate for other uses. In some embodiments, some of the surviving replicas in the partition 314 may be selected as source replicas, tasked with propagating a subset of the partition data to a respective new replica. In this example, both storage nodes 302 and 306 are selected as source replicas. Accordingly, surviving replica 303 begins a copy 340 of a subset of the partition data to the replica allocation 325, and surviving replica 307 begins a copy 342 of another subset of the partition data to the replica allocation 333. The two subsets may be chosen so that they are approximately the same in size, so that the parallel copy 340 and 342 may complete as quickly as possible. In some embodiments, depending on the different reading and/or transmission speeds of the two surviving replicas, differently sized subsets may be assigned to each source replica. For example, in some embodiments, if the surviving replica 303 is a faster source replica than surviving replica 307 by 30%, replica 303 may be assigned a subset of the partition data that is 30% larger than the subset assigned to replica 307.

Figure 3D:
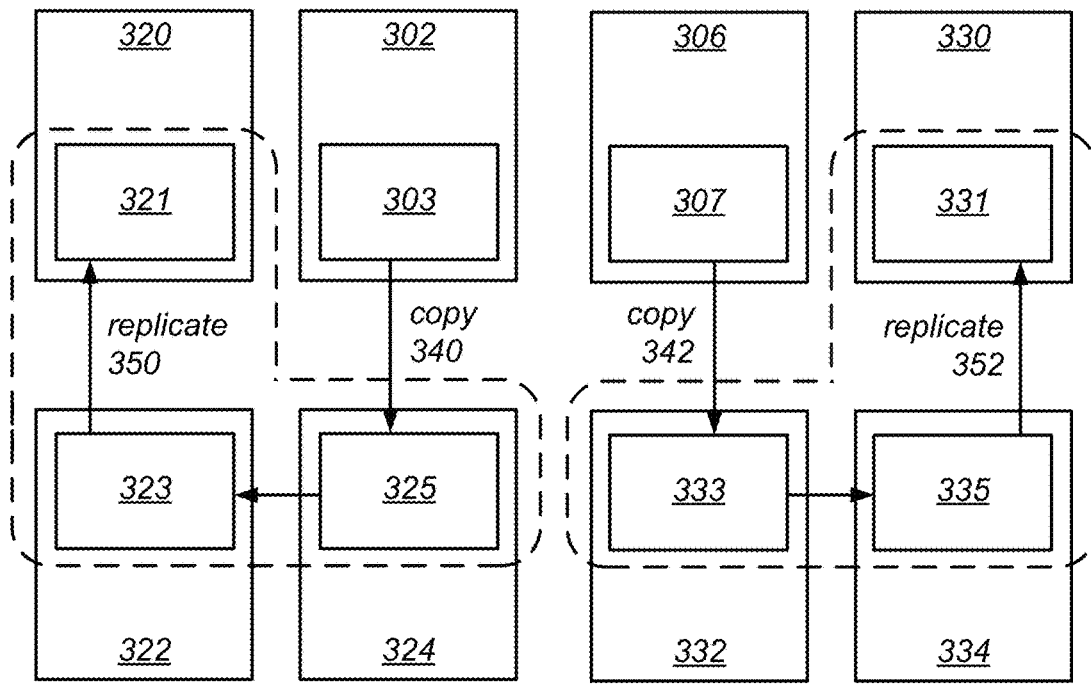

In FIG. 3D, the replication process is initiated. As shown, in some embodiments, the copy may be chained, so that newly allocated replica 325 can stream the data received from surviving replica 303 to newly allocated replica 323, and then newly allocated 321. The chained streaming allows the data to be quickly propagated to all replicas in the new partition. In the chained process, each replica node in the chain may forward the stream to a next node in the chain without completely storing all of streamed data on its local storage. Thus, the chaining allows the transmission and storing of the data to occur largely in parallel, from node to node.

At the end of the replication operations 350 and 352 in FIG. 3D, the data store may be in compliance with its durability model. In some embodiments, the data store may still operate in a state where its data is not fully replicated according to its durability model. However, in this state, a recovery process may be initiated to bring the data store back into compliance with the durability model. By splitting the partition 314 into two new partitions 326 and 336 and performing the copying and replication in parallel, the recovery process is allowed to completed much faster. In some embodiments, the partitions may include more than two surviving partitions, and the degree of parallelization may be increased accordingly to employ one parallel copy for each surviving partition.

Figure 4A:
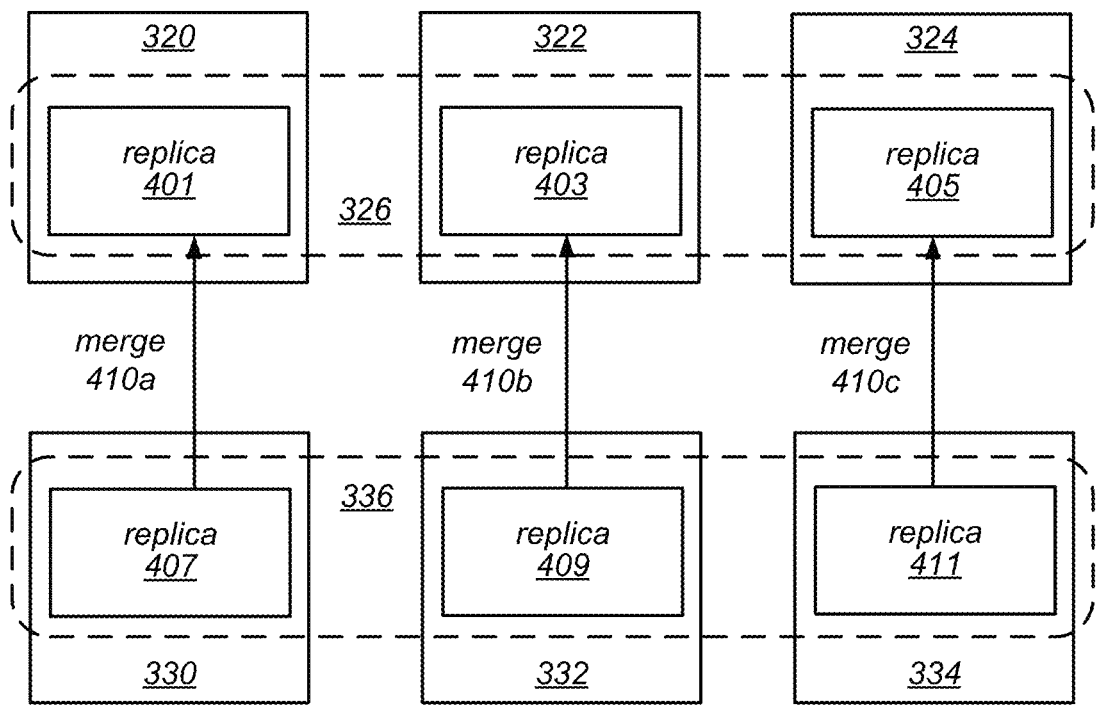
FIGS. 4A-4B are block diagrams illustrating the process of a merge of partitions generated by a fast recovery in a partitioned replicated data store, according to some embodiments.
Figure 4B:
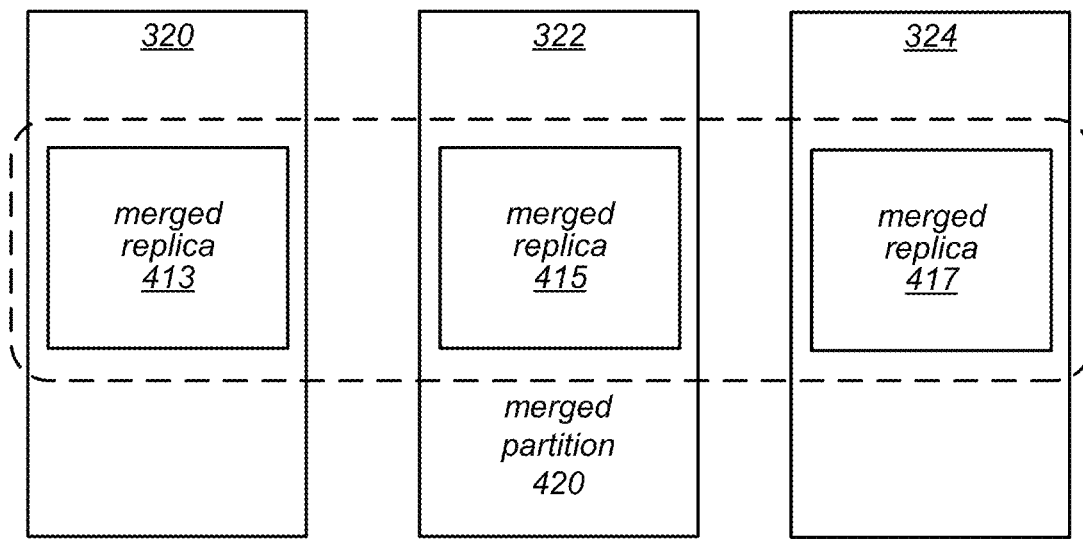

FIGS. 4A-4B are block diagrams illustrating the process of a merge of partitions generated by a fast recovery in a partitioned replicated data store, according to some embodiments. The merge may occur immediately after the recovery process, or in some embodiments, after the passage of a specified period of time. In some embodiments, the merge may occur at a later time, for example, when the new partitions generated from the recovery process (e.g. partitions 326 and 336) are not experiencing heavy traffic loads. In some embodiments, the merge may occur in accordance with the normal repartitioning policy and mechanism of the data store. For example, in some embodiments, the data store may monitor metrics for all partitions of data objects, and merge partitions when warranted. In some cases, the data store may have a policy to merge small and underutilized partitions to conserve resources within the data store cluster.

In some embodiments, the merge step may be performed outside of the normal repartition mechanism of the data store. For example, the merge may occur immediately after the recovery process, and based on the partitioning that was performed during the recovery process. For example, in the illustrated example, the recovery process divided partition 314 into two "half" partitions 326 and 336, each having an equal number of replicas. It may be assumed that the two "half" partitions may be easily re-merged by copying 410a-c the data from each replica of partition 336 into corresponding replicas in partition 326. In some embodiments, data may be merged to an offline partition, which is then brought online atomically after the merge step is completely. In this way, the merge step does not generate excessive access traffic that competes actual traffic from the data store client.

FIG. 4B depicts the result of the merge operation. As shown, the split partitions 326 and 336 are now replaced by a single merged partition 420, having merged replicas 413, 415, and 417. Thus, the merge produces a partition 420 that is similar to the old partition 314, prior to the recovery operation. It is appreciated that during a production environment where the data store comprises many storage nodes each hosting many replicas, a typical failure (e.g. of a node) may generate recovery or repair processes for many partitions, each involving a potentially long copy step. The fast recovery process disclosed herein splits these long copy steps smaller copy steps, which may be performed in parallel using the spare network and compute capacity of the data store resources. Accordingly, the fast recovery process allows the data store to be recovered much more quickly.

Figure 5:
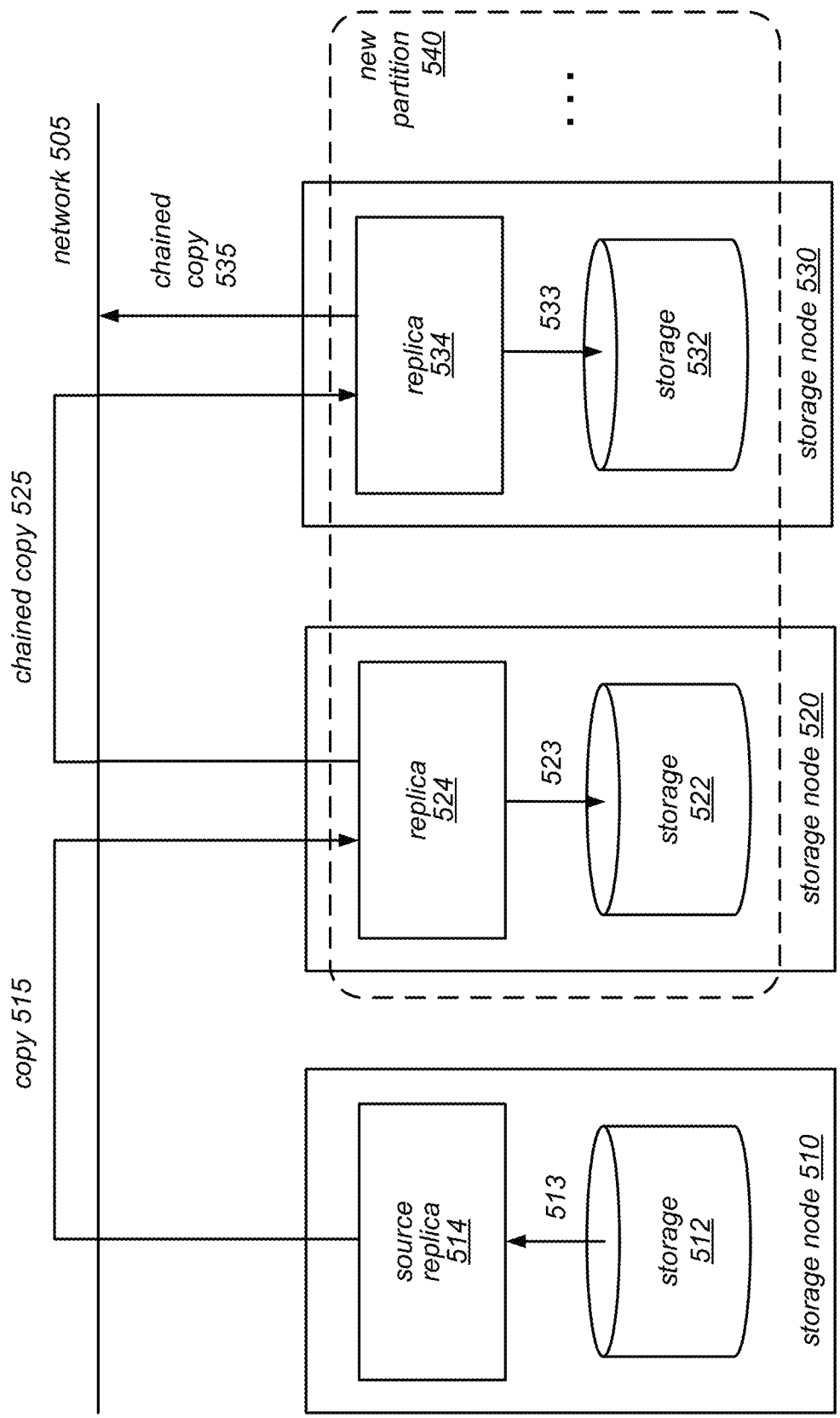
FIG. 5 illustrates example computer system that implements chaining of copies that are performed during a fast recovery of a partitioned replicated data store, according to some embodiments.

FIG. 5 illustrates example computer system that implements chaining of copies that are performed during a fast recovery of a partitioned replicated data store, according to some embodiments. The chained copy may be used in a replication operation to propagate data from one replica to another replica in a new partition, so as to fully replicate data within the replica group of the new partition.

As shown, the system of FIG. 5 includes a storage node 510, which hosts a source replica 514, which stores replica data in storage 512. Similarly, storage nodes 520 and 530 both include their own replica 524 and 534, and stores replica data in storage 522 and 532. In some embodiments, the replicas 514, 524, and 534 include one or more executing instances of software that perform the functions of an individual storage node for the data store. For example, in some embodiments, the storage nodes may implement functions to read and write the data in the partition of data maintained by the partition. The storage 512, 522, and 532 may be one or more persistent storage devices configured to store the data of the partition. Depending on the embodiment, these storages may be dedicated storage devices to the storage node, or network attached storage shared by multiple storage nodes. In some embodiments, the storage of each replica in a replication group must be different, to satisfy a durability requirement.

In the illustrated example, the source replica 514 may initiate a copy 515 request to the other storage nodes 520 and 530. The source replica 514 may read 513 the data to be copied from its storage 512, and the transmit the data to be copied over the network 405 to be received by the replica 524. The network may be, for example, networks 135 or 301 discussed in connection with FIGS. 1 and 3, and/or implement a peer-to-peer communication protocol, for example a message bus 235 as discussed in connection with FIGS. 2A-2C. As discussed, in some embodiments, the source replica 514 may be a surviving replica of a partition that is being recovered. In some embodiments, the source replica 514 may be part of the new partition 540, which is formed as a result of the recovery process, or it may be outside of the new partition 540.

As discussed, the receiving replica 524 may be a new replica that was created for the fast recovery process. Replica 524 may receive the data from the copy operation 415, and forward the data to replica 534 in the partition 540 in a chained copy 525. In addition, the replica 524 may forward the data from the copy operation 515 to its own storage 522 to be persisted. In some embodiments, the copy data may be transmitted and received by the replica 524 as a stream, and forwarded by replica 524 to replica 534 as a stream. Thus, the data may not be fully received before it is forwarded to the next replica in the chain. In some embodiments, the storage operation 523 may also not be complete before the data is streamed to the next replica. Likewise, the next replica 534 may chain copy 535 the data to yet another replica in the chain. In this manner, a large data copy may quickly reach all replicas in the partition 540 without extensive processing delay at each of the replicas. In some embodiments, the tail replica may acknowledge receipt of the write data to the sender of the write data.

In some embodiment, the ordering of the replicas in the chain is specified by a chain mapping maintained by the replica group. In some embodiments, the mapping may indicate a replication chain that places replicas that are close together physically or in the network topology next to each other in the replication chain. In this manner, the replication chain specifies a replication path that results in the quickest replication. In some embodiments, the replication chain may contain branches, such that a single replica may stream to two destination replicas, possibly via two different network interfaces on the storage node. Multiple replication chains may exist in a replica group.

Figure 6:
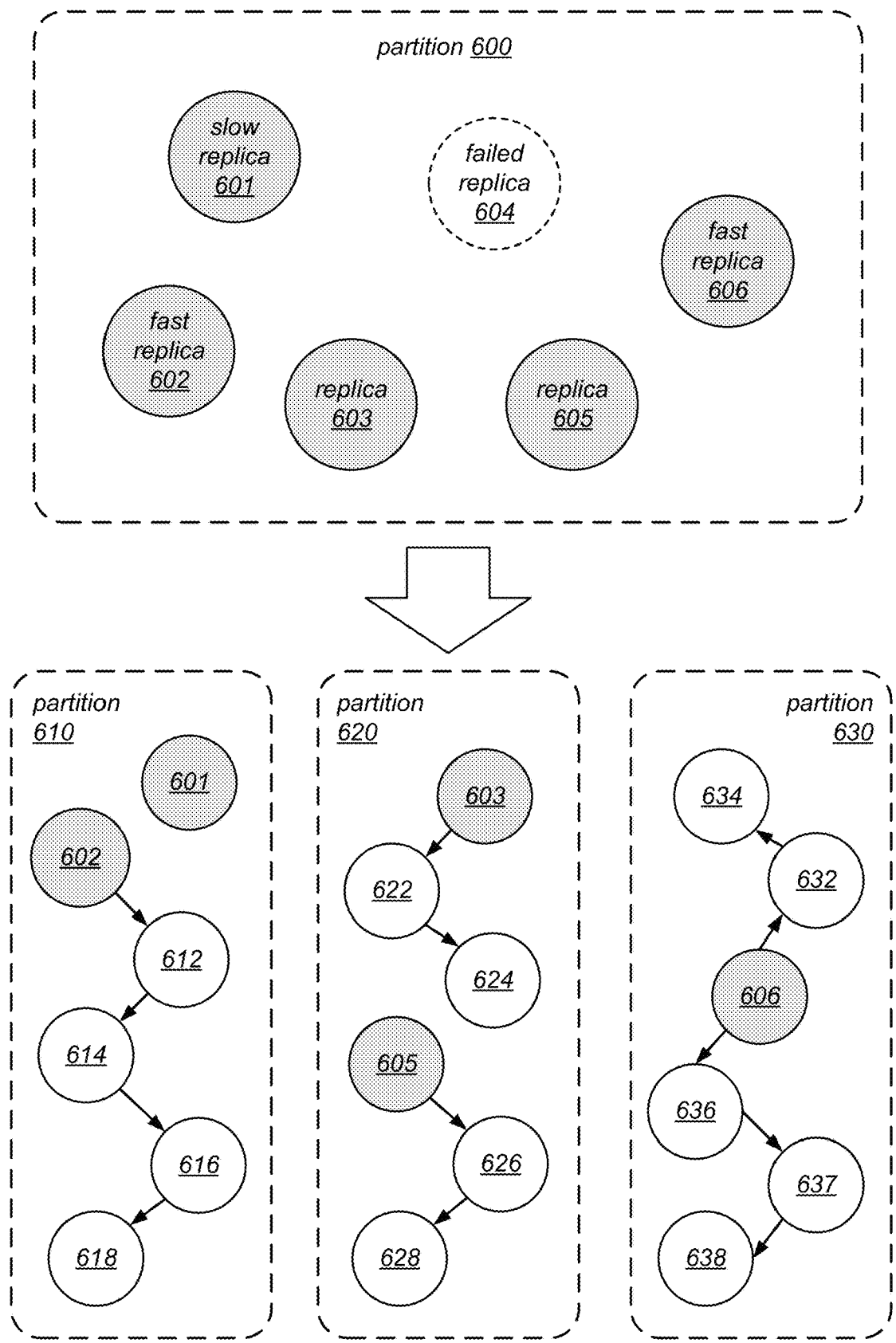
FIG. 6 illustrates an example scenario in a fast recovery in a partitioned replicated data store, according to some embodiments.

FIG. 6 illustrates an example scenario in a fast recovery in a partitioned replicated data store, according to some embodiments. As shown, partition 600 includes six replicas 601-606. In some embodiments, as shown, all partitions of the data store may include the same number of replicas, in this case six. Partition 600 includes a slow replica 601 and two fast replicas 602 and 606. The performance of each replica may depend on the underlying storage node (e.g., processor speed, memory size, I/O capacities, etc.). The qualities of each replica may also depend on the current load of the storage node, or the underlying physical host hosting storage nodes as virtual machine instances. For example, a storage node hosting a large number of replicas may be overloaded by requests, and thus less able to perform other tasks, such as transmitting large amounts of data. In some embodiments, metrics may be maintained for the recent performance of each replica, so that in the event of a recovery, these metrics may be used to determine how surviving replicas may be used to copy data out of the old partition.

As shown, partition 600 has detected a failed replica 604. Consequently, the partition 600 will go into a recovery process. In this illustration, the data store partitions the damaged partition 600 into three new partitions, 610, 620, and 630. The number of new partitions that are generated in this step may be dependent on the configuration settings of the system. In some embodiments, the data store may determine the number of new partitions based on the number of surviving replicas. In some embodiments, the data store may base the decision on additional factors, such as the health and/or capabilities of the surviving replicas. In some embodiments, the data store may form more partitions to increase the speed of recovery. In some embodiments, the data store may form less partitions to avoid spikes in resource utilization during a recovery process. In some embodiments, the number of partition to form may be configurable by the administrator and/or the client. In some embodiments, the decision may depend on runtime factors, which may be indicated in runtime metrics.

Although FIG. 6 shows that partitions 610, 620, and 630 each have six new nodes, which is equal to the number of nodes in partition 600, in some embodiments, the number of replica nodes in the partitions may be variable. For example, partitions 610, 620, and 630 may each have a different number of replica nodes. In some embodiments, the recovery process may split into partitions that have the minimum number of nodes that are allowed by the data store under its durability model. In this manner, the replication step of the recovery process may be performed as quickly as possible.

As shown, each resulting partition 610, 620, and 630 have six replicas, just like partition 600. In this example, surviving replicas 601 and 602 are assigned to partition 610, surviving replicas 603 and 605 are assigned to partition 620, and surviving replica 606 is assigned to partition 630. This division of the surviving replicas is again dependent on the configuration settings of the system and/or the observed metrics of the system. As just one example, the data store may divide the surviving replicas such that each new partition is assigned an aggregate transmission bandwidth above a threshold. The division process may strive to evenly distribute the transmission bandwidth of the surviving replicas, so as to implement a copy process that is as parallelized as possible.

As shown, partition 610 is assigned replicas 601 and 602. In this example, because replica 601 is slow, it is not selected to be a source replica in the copy step. However, fast replica 602 is assigned to the same partition, and fast replica 602 is used to transmit a subset of the data of partition 600 to the other new members of partition 610. As shown, the member replicas 612, 614, 616, and 618 may implement a replication chain to perform the replication in streamed fashion, thus accomplishing full replication in an efficient fashion.

As shown, partition 620 is assigned replicas 603 and 605. Although these are not fast replicas, they are both selected as source replicas, and they divide up the duty of transmitting data by dividing up the new member replicas of partition 620. Thus, replicas 603 and 605 may transmit a second subset of the data of partition 600 in parallel to the other replicas of the new partition. In some embodiments, it may be determined that the combined write capacity of replicas 603 and 605 is greater than the combined write capacity of 602. In that case, the system may assign more data to the second subset of data to be replicated by replicas 603 and 605. In this manner, the sizes of the new partitions 610, 620, and 630 may be different. However, the process is designed so that replication in each partition is completed at approximately the same time, so that data store recovery may be completed as quickly as possible.

As shown, partition 630 is assigned only fast replica 506. However, fast replica 606 is used to transmit a third subset of the partition data to the new member replicas in two path, in parallel. This plan may be chosen by the data store based on known capabilities of the fast replica 606. For example, the data store may be aware that fast replica 606 have enough processing power and memory to sustain a high rate of data transmission. The fast replica 606 may also be hosted on a storage node that has multiple network interfaces, allowing two parallel streams of data to be efficiently transmitted out of the storage node.

It should be noted that the configurations shown in the figure are merely exemplary, and are not intended to limit the full breadth of the inventions disclosed herein. Depending on the embodiment, other data stores may implement different processes, including different numbers of new partitions, replicas, and copying strategies. These and other variations of the inventive concepts are appreciated by persons of ordinary skill in the art, and they may be implemented without departing from the spirit of the inventions disclosed herein.

Figure 7:
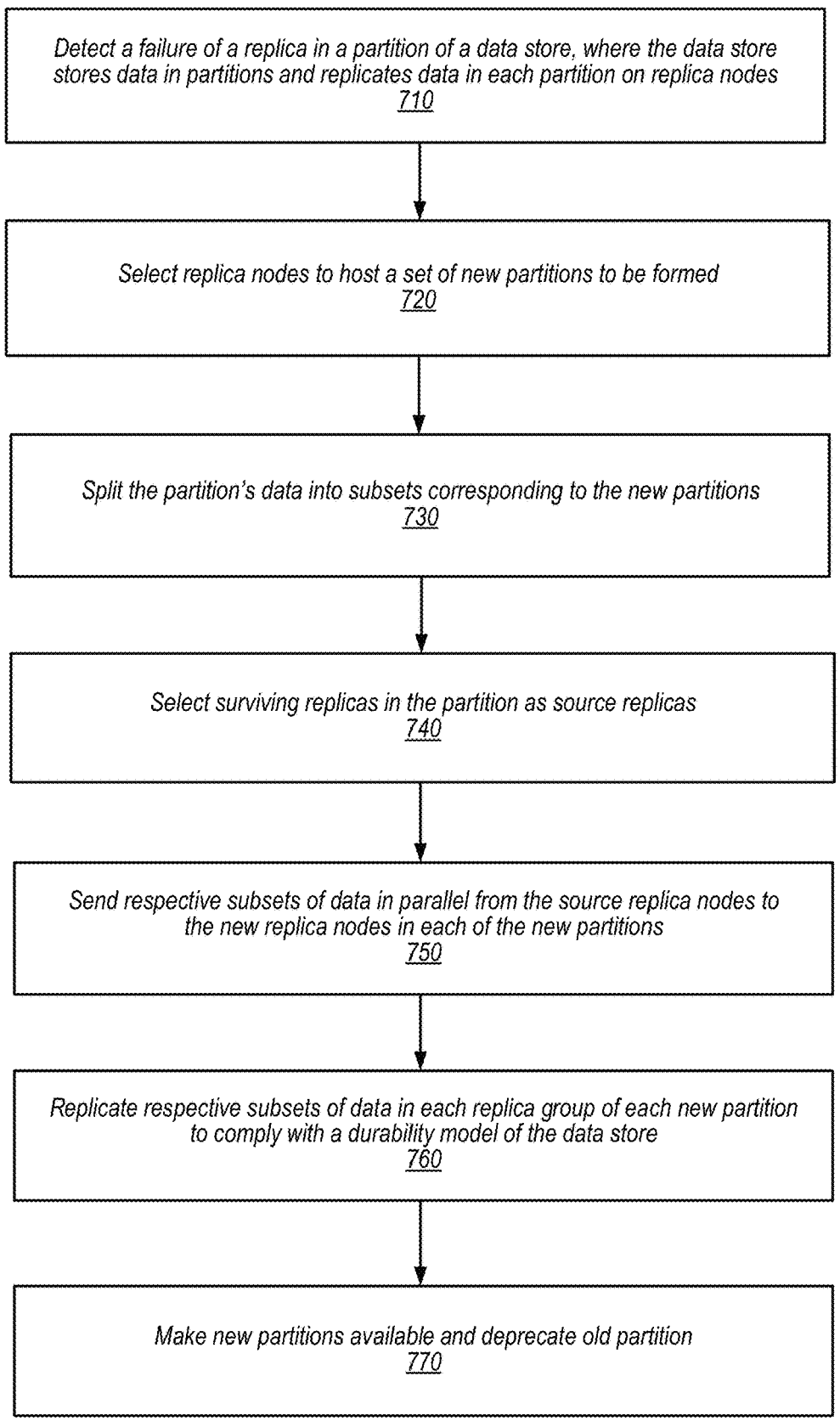
FIG. 7 is a flowchart illustrating a process of performing a fast recovery in a partitioned replicated data store, according to some embodiments.

FIG. 7 is a flowchart illustrating a process of performing a fast recovery in a partitioned replicated data store, according to some embodiments. The process may be performed by replica failure detector 152 and fast recovery manager 154, as discussed in combination with FIG. 1.

At operation 710, a failure of a replica in a partition of a data store is detected. The data store may store data, such as a table, in partitions. The data store may also replicate data in each partition of data in replica nodes. In some embodiments, the replica failure detector may detect that a replica node associated with a replica has become unresponsive. In some embodiments, a failed replica may indicate a violation of a durability requirement specified in the durability model of the data store. If the replica failure detector detects that a partition is not in a healthy state, it may initiate a recovery or repair process.

At operation 720, replica nodes are selected to host a set of new partitions to be formed. Operation 720 may be performed by the fast recovery manager 154, as discussed in connection with FIG. 1. The formation of the new partitions may be performed as part of a split operation that to split an existing partition of the data store. In some embodiments, the surviving replicas may be divided among the new partitions. In some embodiments, the number of new partitions may be equal to the number of surviving replicas, and each surviving replica is assigned to a new partition. Each new partition may be hosted by a replica group, where data in the partition is replicated on a plurality of replica nodes to satisfy the durability model of the data store. Thus, in operation 720, new replica nodes are selected to form the replica groups for the new partitions. In some embodiments, the replica nodes may be selected from a pool of replica nodes maintained by the data store. The replica nodes may be selected to satisfy a durability model of the data store.

At operation 730, data of the partition that included the failed replica is split into subsets corresponding to the new partitions. Operation 730 may be performed by the fast recovery manager 154 of FIG. 1. The partition's data may be divided into approximately equal portions to be distributed among the new partitions. However, in some embodiments, the subsets of data may not have approximately equal sizes, depending on certain factors. For example, a larger subset may be assigned to a new partition that includes a fast surviving replica, which is able to transmit data to its new partition more quickly than the other surviving replicas. In this manner, the parallelized copying process of data from the surviving replicas to the new replica nodes may be perform as quickly as possible.

At operation 740, surviving replicas in the partition are selected as source replicas. Operation 740 may be performed by the fast recovery manager 154 of FIG. 1. In some embodiments, the source replicas may be selected based on respective capabilities of the surviving replica nodes, based on metrics. For example, in some embodiments, the source replicas may be selected based on a speed metric of their respective replica nodes. In some embodiments, every surviving replica may be used as a source replica to transmit data to new replica nodes. However, in other embodiments, only a subset of surviving replicas may be selected as source replicas. For example, some surviving replicas may be deemed too slow or unfit to act as a source replica for other reasons. In some embodiments, surviving replicas on fast replica nodes or replica nodes with multiple network interfaces may be chosen to act as source replicas for larger subsets of the partition's data. As discussed, in some embodiments, the subsets of data may not have equal sizes. The respective sizes of the subsets of data may be determined based on the relative speed metrics of the surviving replica nodes.

At operation 750, the subsets of data are sent in parallel by the selected source replica nodes to the new replica nodes in each of the new partitions. Operation 740 may be performed by the fast recovery manager 154 of FIG. 1. The operation may be performed as part of the partition split operation supported by the data store. In some embodiments, the network used by the operation is fully multiplexed (e.g., a packet network), so that network contention does not impact the transmission speed of the respective source replica nodes. In some embodiments, source replica nodes that have multiple network interfaces or multiple process cores may utilize its resources in parallel to perform the transmission operation in parallel, so as to speed up its own transmission. In this manner, the copying of data from surviving replicas to the new replicas may be performed in parallel as much as possible, to be completed as quickly as possible.

At operation 760, the subsets of data are replicated in each respective replica group of the new partitions to comply with a durability model of the data store. As discussed, the failure of the replica initially may cause the partition associated with the replica to fall out of compliance with a durability requirement of the data store. For example, the data store may require that all partitions must replicate its data in a minimum number of replicas. At operation 760, the replication operation performed in each replica group ensures that each new replica group sufficiently replicates its subset of data to comply with the durability requirement of the data store. The replication operation may be performed as quickly as possible. In some embodiments, some parts of the replication copying may be parallelized. For example, in some cases, once a new replica node has received the subset of data, it may act as another source replica to the other replicas in the new replica group. In some embodiments, a chaining technique may be used to transmit the subset of data to the replica nodes, where the data is streamed from one node to the next as a stream. The intermediate replica nodes that relays the data may not fully receive or store the data before forwarding the stream to the next replica node in the chain.

At operation 770, the new partitions are made available to the data store, and the old partition is deprecated so that it is no longer used by the data store. Any storage space allocated to the surviving replicas may be deallocated to be used for other purposes, if the surviving replicas do not join the new partitions. If the surviving replicas do join the new partitions, their data may be trimmed to match the subset of data that is managed by their respective partitions. To make the new partitions available, the fast recovery manager 154 or some other module in the control plane may update metadata for the data store object to refer to the new partitions. In some embodiments, the old partition may continue to operate until the new partitions are fully formed and replicated. When the recovery process is complete, the metadata update may occur atomically, so that users of the data store may not perceive any down time.

In some embodiments, at a later time, the new partitions may be merged back to form a merged partition, while maintaining compliance with the durability model. In some embodiments, the merge operation may be performed immediately after the recovery process, which can produce a large number of small partitions to replace the old partition with the failed replica. In some embodiments, the merge may be performed lazily, based on the normal partitioning policy of the data store. For example, the data store may recognize that the resulting partitions are too small to justify a large number of partitions. Accordingly, the data store may merge the resulting partitions according to its partitioning policy. However, at the end of the recovery process, the data store is brought back into compliance with the requirements of its durability model. Thus, by splitting the original partition, the recovery process is able to meet the durability model of the data store more quickly.

Figure 8:
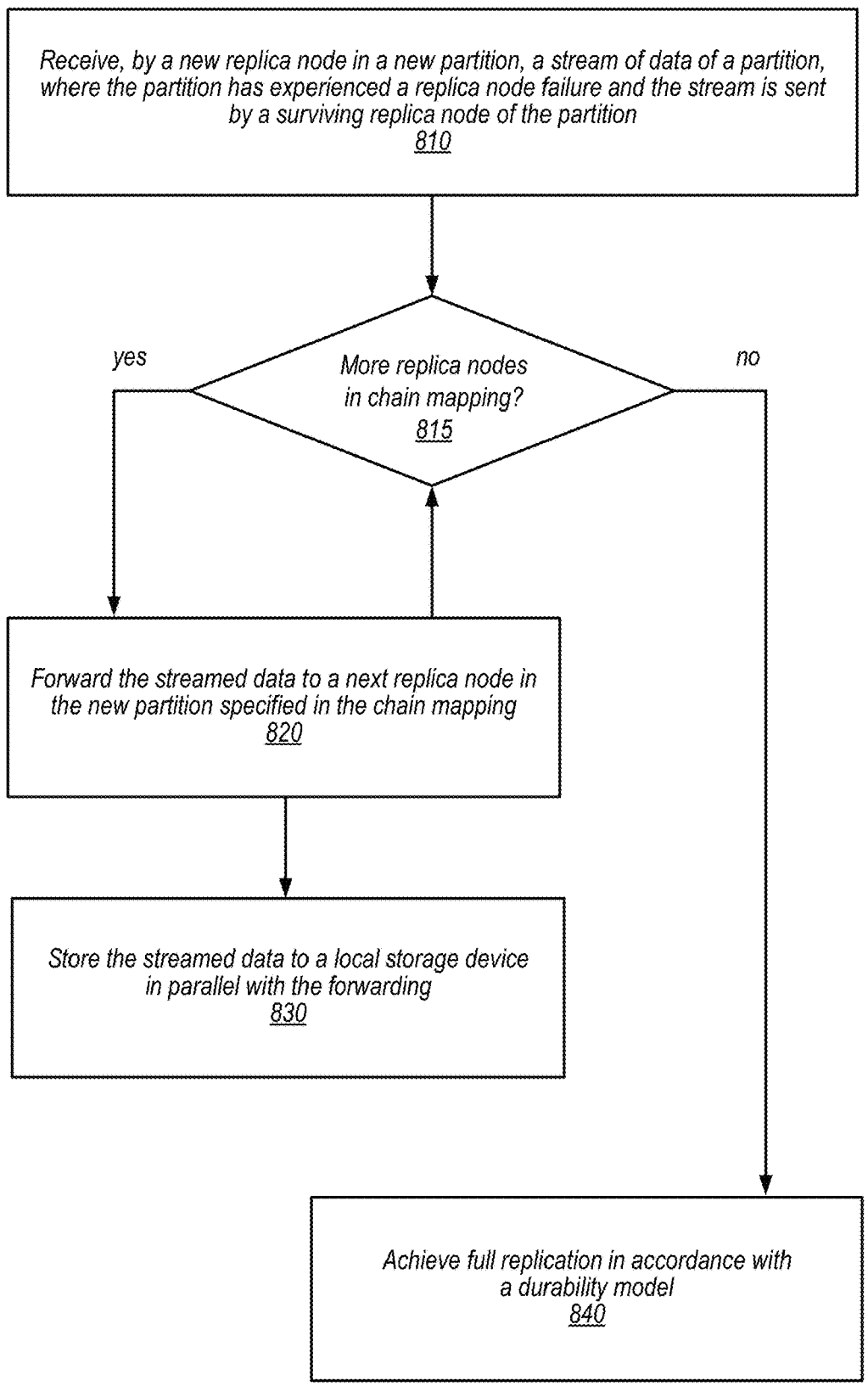
FIG. 8 is flowchart illustrating a process of a chained copy during a fast recovery in a partitioned replicated data store, according to some embodiments.

FIG. 8 is flowchart illustrating a process of a chained copy during a fast recovery in a partitioned replicated data store, according to some embodiments. The process may be performed by the fast recovery manager 154 of FIG. 1. In some embodiments, the process may be performed as a replication operation of the data store, which is configured to distribute any received data across all nodes in the replica group.

At operation 810, a stream of data of a partition is received by a new replica node in a new partition. The streamed data may be received from a surviving replica node of the partition, where the partition has experienced a failed replica node. The operation may occur as a result or as part of a recovery operation of the data store, and as discussed, and the new replica node and new partition may be formed as a result of a split operation performed during the recovery operation.

At operation 815, a determination is made whether more replica nodes exist on a chain mapping. The chain mapping may be maintained by a replica group that includes the new replica node. The mapping may indicate an order in which streamed data is to be transmitted from one replica node to the next to allow data to be fully distributed to all nodes in the replica group. In some embodiments, the mapping may indicate a distribution tree. In some embodiments, a replication chain may place replicas that are close together physically or in the network topology next to each other in the replication chain. In this manner, the replication chain specifies a replication path that results in the quickest replication process.

At operation 820, if there are more replica nodes indicated by the chain mapping, the stream of data is forwarded to a next replica node in the new partition specified by the chain mapping. The forwarding may be performed by a replica node that is already receiving the stream. However, without fully receiving all the data in the stream or fully storing the data, the receiving node may forward the stream to the next replica node. In this manner, the transmission of a large volume of data may be parallelized to a large extent among the nodes of the replica group, without waiting for the transmission to finish on any particular node. The operation 820 then returns to operation 815 to check if more replica nodes remain on the chain mapping. The process repeats until streaming is initiated for all replica nodes in the chain mapping.

At operation 830, the streamed data is stored to a local storage device in parallel with the forwarding of the streamed data to the next node. Thus, at each replica node in the replica group, the storing of the streamed data may occur concurrently with the forwarding of the streamed data to other nodes. Thus, each node in the replica group will begin to receive streamed data without waiting for all of the streamed data to be stored in the previous node. This parallelization allows the replication process to complete faster in the replica group.

At operation 840, if no more replica nodes are indicated by the chain mapping, the new partition may simply wait until the replica group achieves full replication in accordance with a durability model. The durability model may be a durability model specified by the data store, which dictates the number and types of replicas that must be maintained for data in the data store. In some embodiments, after each replica finishes storing the streamed data, it may send an acknowledgment to a master replica node, which in some embodiments may be the source replica node selected by the recovery process to seed the new replica group. In some embodiments, a further acknowledgment may be sent to the fast recovery manager 154 of FIG. 1, which may then update global metadata to indicate that new partition is in compliance with the durability model.

Figure 9:
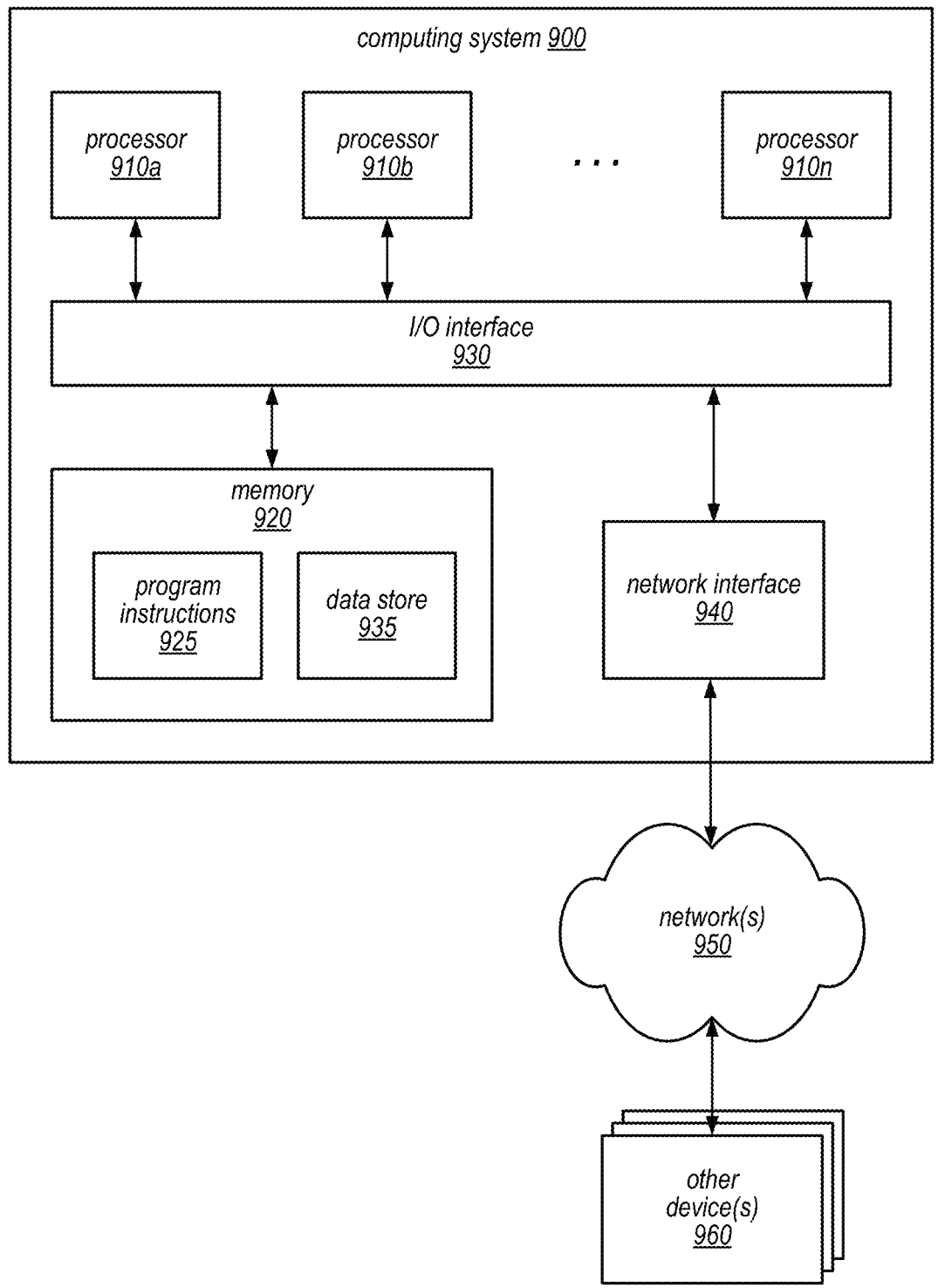
FIG. 9 is a block diagram illustrating an example computer system that can be used to implement one or more portions of a data store that implements a fast recovery in a partitioned replicated data store, according to some embodiments.

FIG. 9 is a block diagram illustrating an example computer system that can be used to implement one or more portions of a data store that implements a fast recovery in a partitioned replicated data store, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
   a data store implemented by one or more compute nodes, each node implemented by one or more processors and associated memory, wherein the data store stores an object in partitions and replicates data in individual ones of the partitions in respective replica groups of replica nodes to satisfy a durability model, the data store configured to:
      detect a failure of a replica node of a given partition of the object such that the data store includes a failed replica node of the given partition and two or more surviving replica nodes of the given partition;
      in response to the failure, perform a recovery operation, wherein the recovery operation comprises operations to:
         select a plurality of groups of replica nodes to store a plurality of new partitions of the object, each of the selected groups of replica nodes to store replicas of a respective different one of the new partitions, wherein a first group of the selected groups of replica nodes includes a first one of the two or more surviving replicas nodes of the given partition, and a second group of the selected groups of replica nodes includes a second one of the two or more surviving replicas nodes of the given partition;
         split the given partition's data into a plurality of different subsets of data, each different subset of data for a respective different one of the new partitions;
         send, in parallel and over a network:
            a first subset of the plurality of different subsets of data from the first surviving replica node of the given partition to a first new replica node of the first group of the selected groups of replica nodes; and
            a second subset of the plurality of different subsets of data from the second surviving replica node of the given partition to a second new replica node of the second group of the selected groups of replica nodes, wherein the first new replica node and the second new replica node are different nodes on the network that are each sent in parallel a different portion of the given partition's data as part of the recovery operation; and
         replicate each subset of the plurality of different subsets of data in each respective selected group to satisfy the durability model.

2. The system of claim 1, wherein a number of the plurality of different subsets for the split is based on a number of surviving replica nodes.

3. The system of claim 1, wherein the data store is to split the given partition's data into the plurality of different subsets such that each subset is sized based on a metric of a surviving replica node selected to send the subset to a new replica node.

4. The system of claim 1, wherein to replicate a subset of data in a new replica group, the data store is to perform a recovery operation that causes the first new replica node in the first new replica group to:
   receive a stream of a subset of data from the first surviving replica node; and
   forward the stream to a second new replica node in the first new replica group as the stream is being received by the first new replica node.

5. The system of claim 1, wherein the data store is to merge the new partitions to create a merged partition after each subset of data has been replicated in each respective new partition to satisfy the durability model, wherein the merged partition also satisfies the durability model.

6. A method, comprising:
   detecting a failure of a replica node of a given partition of an object such that a data store that stores partitions of the object includes a failed replica node of the given partition and two or more surviving replica nodes of the given partition;
   in response to the failure, performing a recovery operation, wherein the recovery operation comprises operations of:
      selecting a plurality of groups of replica nodes to store a plurality of new partitions of the object, each of the selected groups of replica nodes to store replicas of a respective different one of the new partitions, wherein a first group of the selected groups of replica nodes includes a first one of the two or more surviving replicas nodes of the given partition, and a second group of the selected groups of replica nodes includes a second one of the two or more surviving replicas nodes of the given partition;

splitting the given partition's data into a plurality of different subsets of data, each different subset for a different one of the new partitions; and sending, in parallel over a network:
- a first subset of the plurality of different subsets of data from the first surviving replica node of the given partition to a first new replica node of the first replica group of the selected groups of replica nodes; and
- a second subset of the plurality of different subsets of data from the second surviving replica node of the given partition to a second new replica node of the second group of the selected groups of replica nodes, wherein the first new replica node and the second new replica node are different nodes on the network that are each sent in parallel a different portion of the given partition's data as part of the recovery operation; and replicating each subset of the plurality of different subsets of data in each respective selected group of replica nodes to satisfy a durability model.

7. The method of claim 6, further comprising merging at least two of the new partitions to create a merged partition after the new partitions have been fully replicated to satisfy the durability model, wherein the merged partition also satisfies the durability model.

8. The method of claim 6, wherein replicating a subset of data in a new replica group comprises:
- receiving, by the first new replica node in the first new replica group, a stream of the subset of data from the first surviving replica node; and
- forwarding, by the first new replica node, the stream to another new replica node in the first new replica group as the stream is being received by the first new replica node in the first new replica group.

9. The method of claim 6, wherein said splitting the given partition's data comprises selecting at least one of the surviving replica nodes as a source replica node to send a subset of data based at least in part on a metric of the at least one surviving replica node.

10. The method of claim 6, wherein said splitting the given partition's data into the plurality of different subsets is performed such that each subset is sized based on a metric of a surviving replica node assigned to send the subset to a new replica node.

11. The method of claim 6, wherein:
said splitting the given partition's data comprises:
- forming a number of new partitions equal to a number of surviving replica nodes in the partition; and
- splitting the partition's data into a number of subsets equal to the number of new partitions.

12. A non-transitory computer-accessible storage medium storing program instructions that when executed on one or more processors of a data store cause the data store to:
- detect a failure of a replica node of a given partition of an object such that a data store that stores the object includes a failed replica node of the given partition and two or more surviving replica nodes of the given partition;
- in response to the failure, perform a recovery operation, wherein the recovery operation comprises operations to:
  - select a plurality of groups of replica nodes to store a plurality of new partitions of the object, each of the selected groups of replica nodes to store replicas of a respective different one of the new partitions, wherein a first group of the selected groups of replica nodes includes a first one of the two or more surviving replica nodes of the given partition, and a second group of the selected groups of replica nodes includes a second one of the two or more surviving replica nodes of the given partition;
  - split the given partition's data into a plurality of different subsets of data, each different subset of data for a respective different one of the new partitions;
  - send, in parallel and over a network:
    - a first subset of the plurality of different subsets of data from the first surviving replica node of the given partition to a first new replica node of the first group of the selected groups of replica nodes; and
    - a second subset of the plurality of different subsets of data from the second surviving replica node of the given partition to a second new replica node of the second group of the selected groups of replica nodes, wherein the first new replica node and the second new replica node are different nodes on the network that are each sent in parallel a different portion of the given partition's data as part of the recovery operation; and
  - replicate each subset of the plurality of different subsets of data in each respective selected group of replica nodes to satisfy a durability model.

13. The non-transitory computer-accessible storage medium of claim 12, wherein to replicate a subset of data in a new replica group, the program instructions when executed on the one or more processors cause the data store to:
- receive, at the first new replica node of the first new replica group, a stream of a subset of data from the first surviving replica node; and
- forward, by the first new replica node of the first new replica group, the stream to another new replica node in the first new replica group as the stream is being received by the first new replica node of the first new replica group.

14. The non-transitory computer-accessible storage medium of claim 12, wherein the failure of a replica comprises a failure of a replica node hosting the replica, and to perform the recovery operation, the program instructions when executed on the one or more processors cause the data store to perform the split operation on all replicas hosted on the failed replica node.

15. The non-transitory computer-accessible storage medium of claim 12, wherein to perform said split the given partition's data, the program instructions when executed on the one or more processors cause the data store to select the surviving replica node as a source replica node to send a subset of data based at least in part on a metric of the surviving replica node.

16. The non-transitory computer-accessible storage medium of claim 12, wherein to split the given partition's data into the plurality of subsets, the program instructions when executed on the one or more processors cause the data store to split the data such that each subset is sized based on a metric of a surviving replica node assigned to send the subset.

17. The non-transitory computer-accessible storage medium of claim 12, wherein to perform said split the given partition's data, the program instructions when executed on the one or more processors cause the data store to:

form the new partitions equal in number to a number of surviving replica nodes in the given partition; and
split the given partition's data into the plurality of subsets equal in number to the number of new partitions.

\* \* \* \* \*